(12) United States Patent
DiSabatino

(10) Patent No.: US 6,769,343 B2
(45) Date of Patent: Aug. 3, 2004

(54) TREE FELLING DISC SAW TOOTH AND BLADE CONSTRUCTION

(75) Inventor: Benjamin DiSabatino, Brantford (CA)

(73) Assignee: Timberjack Inc., Woodstock (CA)

( * ) Notice: Subject to any disclaimer, the term of this patent is extended or adjusted under 35 U.S.C. 154(b) by 0 days.

(21) Appl. No.: 09/900,100

(22) Filed: Jul. 6, 2001

(65) Prior Publication Data

US 2002/0002892 A1 Jan. 10, 2002

Related U.S. Application Data

(60) Provisional application No. 60/216,614, filed on Jul. 7, 2000.

(51) Int. Cl.[7] .............................................. B27B 33/08
(52) U.S. Cl. ......................................... 83/835; 83/842
(58) Field of Search ........................... 144/241; 83/840, 83/839, 835, 838, 844, 845, 836, 853–854, 955; 241/294

(56) References Cited

U.S. PATENT DOCUMENTS

| 4,446,897 A | 5/1984 | Kurelek |
| 4,593,733 A | 6/1986 | Hamilton |
| 4,738,291 A | 4/1988 | Isley |
| 5,377,731 A | * 1/1995 | Wildey ...................... 144/218 |
| 5,579,674 A | 12/1996 | Wildey |
| 5,647,263 A | 7/1997 | Wildey |
| 5,813,308 A | 9/1998 | Wildey et al. |
| 6,176,445 B1 | 1/2001 | Shinn |

* cited by examiner

Primary Examiner—Glenn Caldarola
Assistant Examiner—Tom Duong
(74) Attorney, Agent, or Firm—Quarles & Brady LLP

(57) ABSTRACT

A saw blade for a tree felling head has three tipped teeth in which only one tip of each tooth is exposed outside of the blade disc. Around the circumference of the blade, teeth with tips exposed on the upper side of the blade alternate with teeth having tips exposed on the lower side of the blade. Axes of the teeth are tangent to radii of the disc and angled upwardly or downwardly relative to the plane of the disc, and mating surfaces on the teeth and disc at 45° to the plane of the disc abut against rotation and loading of the teeth.

7 Claims, 7 Drawing Sheets

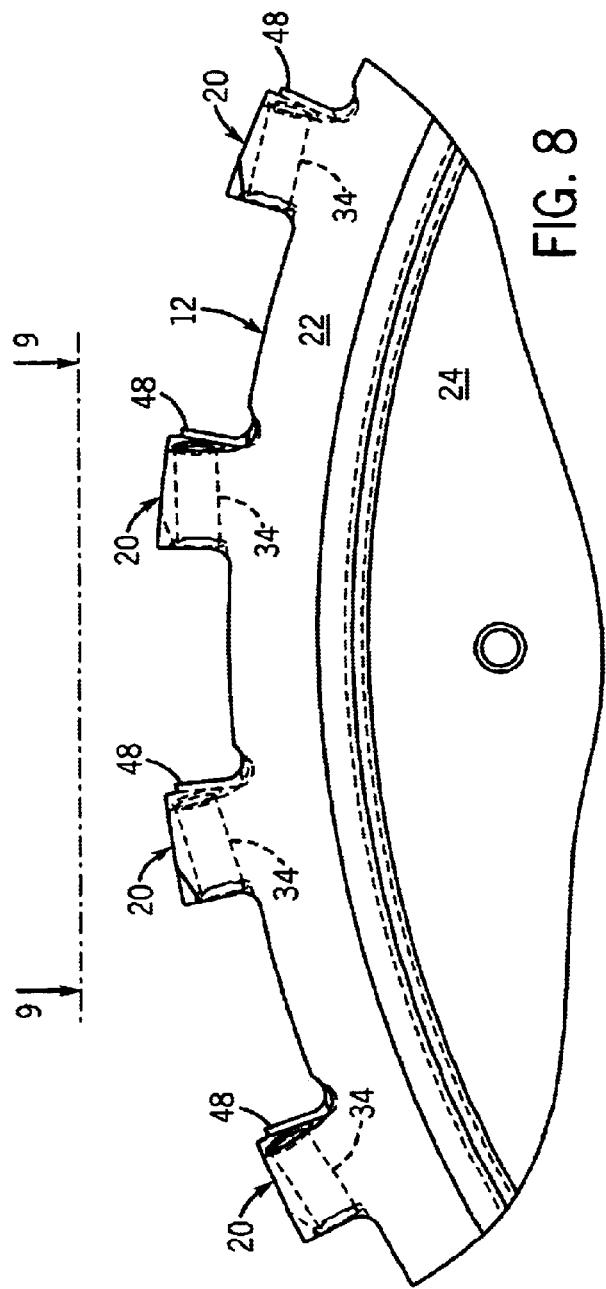
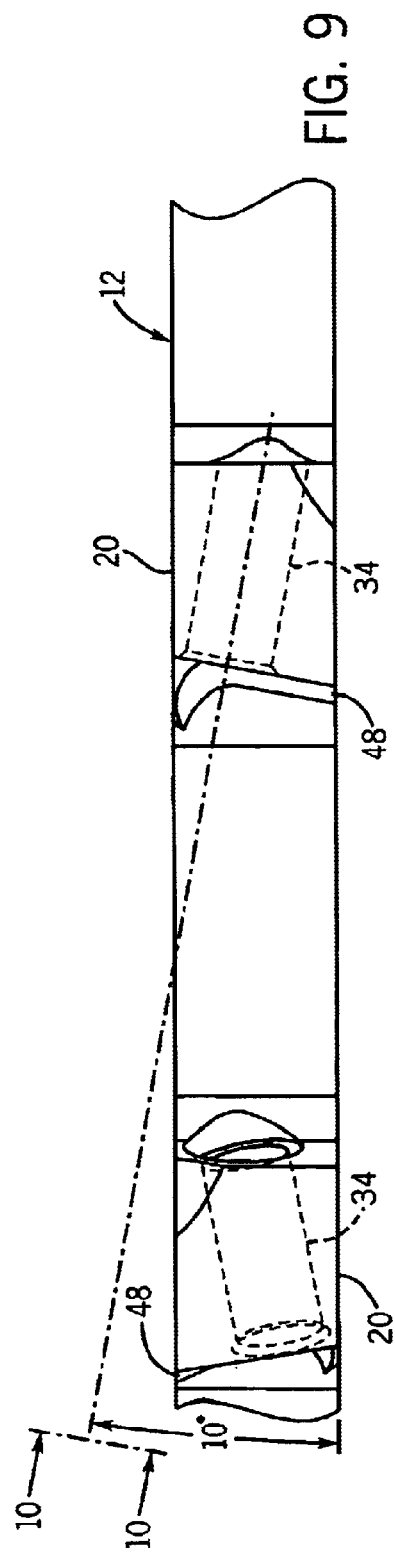

US 6,769,343 B2

TREE FELLING DISC SAW TOOTH AND BLADE CONSTRUCTION

CROSS-REFERENCE TO RELATED APPLICATION

This claims the benefit of U.S. Provisional Patent Application No. 60/216,614 filed Jul. 7, 2000.

STATEMENT CONCERNING FEDERALLY SPONSORED RESEARCH OR DEVELOPMENT

Not applicable.

FIELD OF THE INVENTION

This invention relates to tree felling heads, and in particular to the construction of a tooth and a disc saw blade for such heads.

BACKGROUND OF THE INVENTION

Four-sided rotatable teeth for disc saw blades of tree felling heads are known, for example, from U.S. Pat. Nos. 5,579,674; 5,647,263; and 5,813,308. With such teeth, one edge of the tooth is positioned radially outermost from the rotary axis of the blade to cut a kerf in a standing tree. The tooth is oriented on the blade with one of the sides on the outside of the blade so that the cutting edge is substantially vertical in the cutting position of the blade, as the blade is advanced through a tree. The outside cutting edge forms the kerf by chiseling off the working (vertical) surface of the kerf, and chips from the cutting operation flow along the attack face of the tooth for evacuation from the kerf. When the outside edge becomes dull, the tooth is rotated about its longitudinal axis and resecured to present a sharper edge in the outermost position for cutting. When all edges become dull, the tooth is replaced or reconditioned.

With such teeth, two of the sides of the tooth are in a substantially horizontal plane, one of the horizontal sides being on the top side of the tooth and the other horizontal side being on the bottom side of the tooth. The top side of the tooth is in close proximity or contact with the top side of the kerf (on the tree trunk) and the bottom side of the tooth is in close proximity or contact with the lower side of the kerf (on the top of the stump). This close proximity or contact results in a certain amount of wear along the top side edge and bottom side edge of the tooth during a cutting operation. Of course, the outermost edge also wears, since it does most of the cutting. Thus, with four-sided teeth, edges and tips of the teeth which are not forming the kerf are being worn during the cutting operation, with the effect of inefficiently reducing the useful life of the tooth.

SUMMARY OF THE INVENTION

The present invention provides a disc saw blade which has multi-tip rotatable teeth in which only one tip of each tooth is exposed outside of the plane of the blade to cut a kerf in a tree. Thereby, only one of the tips of each tooth wears in each position of the teeth, and the other tips are protected in each position.

In a preferred form, each tooth has three cutting tips, with one tip of each tooth subjected to wear during the cutting operation and the other two protected within the plane of the blade. The two idle cutting tips are below the worn position of the active cutting tip, and therefore, do not engage the kerf until they are rotated to a cutting position.

The invention also provides a tooth in which one tooth size can be used on blades of various kerf sizes. Smaller teeth allow for a smaller gullet which permits the use of a butt plate which extends out further (i.e., larger in radius) to support cut trees on.

Preferably, locating surfaces on the tooth and disc are angled up or down, preferably at 45°, to locate each tooth with a tip exposed to cut either the upper or lower surface of the kerf. Such surfaces can counteract vertical, horizontal and tangential loads and prevent rotation of the teeth relative to the disc, to help relieve the other parts of the tooth mount. In addition, at least one of the locating surfaces can be angled to exert a preload force on the tooth as the two surfaces are drawn together.

In another preferred aspect, the side surfaces of the teeth which define the cutting tips diverge from one another at an angle of greater than 60° to an apex of each side surface. This adds tooth material at the tip to slow down the wear of the exposed tip.

In another preferred form, the axis of each tooth is angled either up or down relative to the cutting planes, to position one of the cutting tips of each tooth in either the upper or lower cutting plane. This enables using smaller teeth, which results in advantages in the cost of the teeth, the size of the butt plate (larger in area and thicker for a given size tooth) and the cutting power requirement.

The foregoing and other objects and advantages of the invention will appear in the detailed description which follows. In the description, reference is made to the accompanying drawings which illustrate a preferred embodiment of the invention.

BRIEF DESCRIPTION OF THE DRAWINGS

FIG. 8 is a top plan view of a portion of the blade disc;

FIG. 9 is a view from the plane of the line 9—9 of FIG. 8 of a portion of the blade disc;

DETAILED DESCRIPTION OF THE PREFERRED EMBODIMENT

Figure 1:
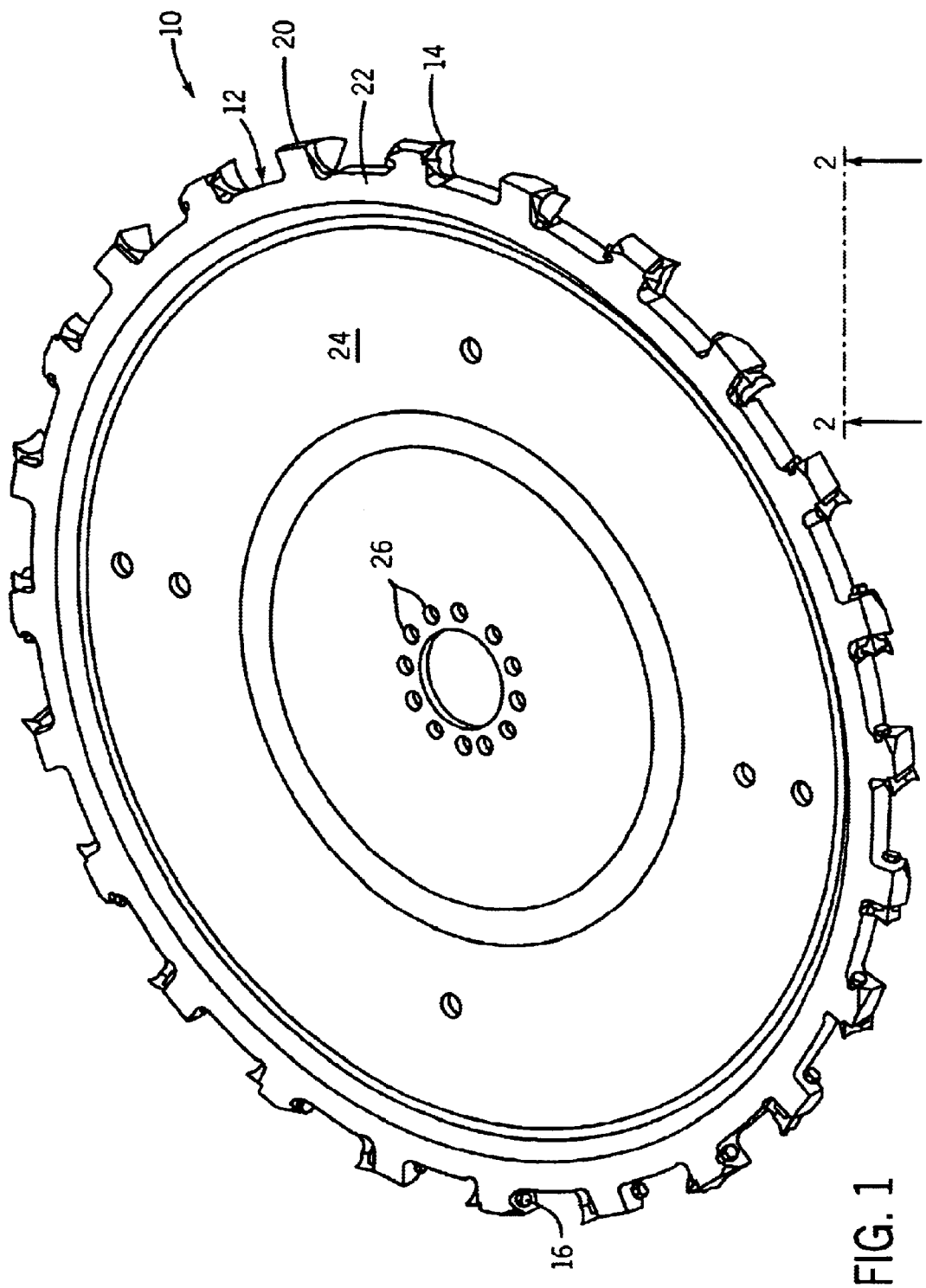
FIG. 1 is a perspective view of a disc saw of the invention including teeth of the invention.

Referring to FIG. 1, a saw blade 10 of the invention includes a saw blade disc 12 and a plurality (24 in the embodiment illustrated) of cutting teeth 14. A similar plurality of fasteners 16 secure the teeth 14 to the tooth holders 20 which are formed integral with a rim 22 of the disc 12. The rim 22 may be symmetrical relative to the central plane of the interior portion 24 of the disc 12, or may be offset to one side as described in U.S. Pat. No. 5,377,731, the disclosure of which is hereby incorporated by reference. Mounting holes 26 are provided in the disc 12 for mounting it to the motor, typically hydraulic, of a felling head, and the disc 12 is rotated at high speed by the head so as to rotate about a generally vertical axis, as is well known.

Figure 7:
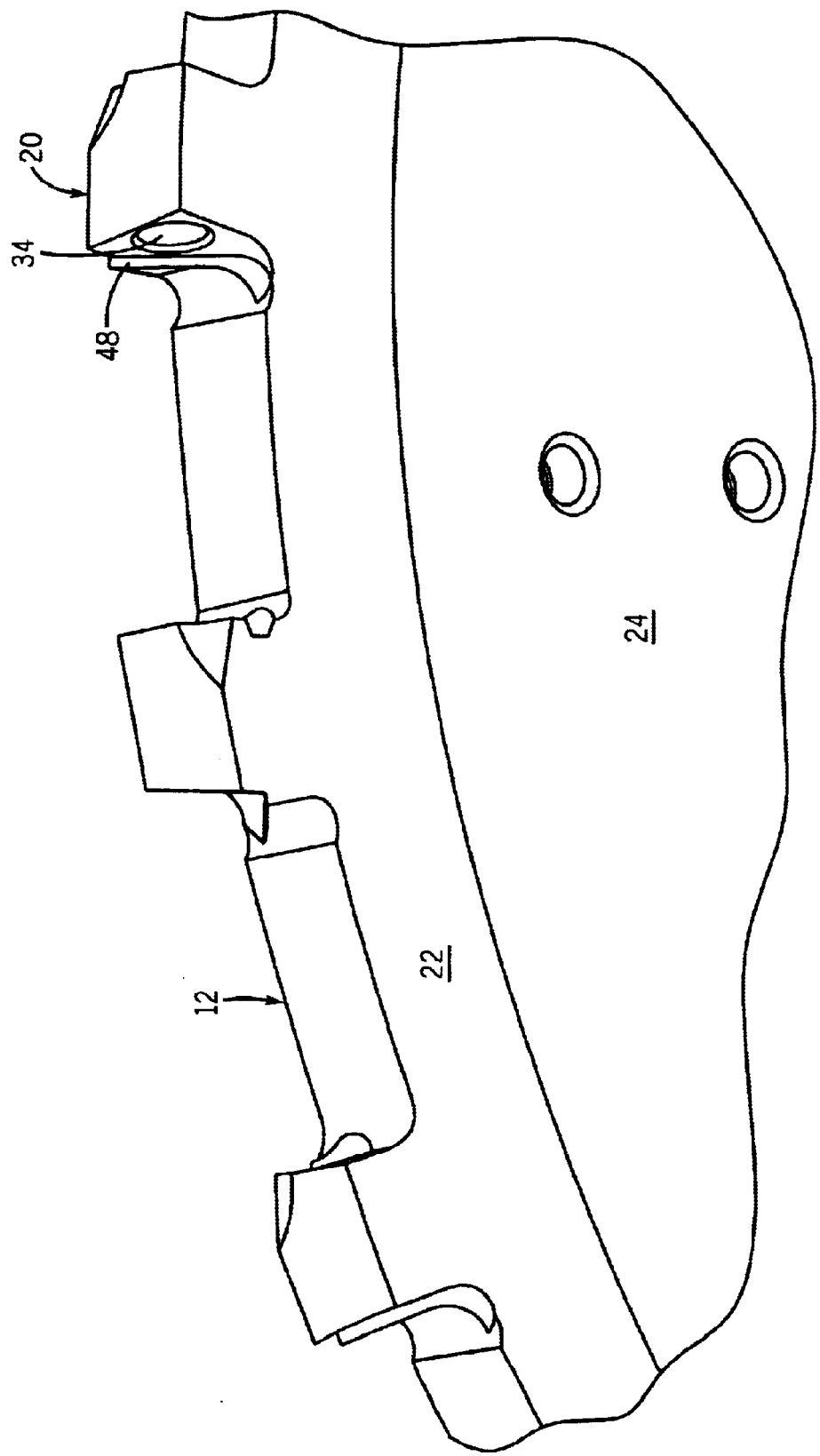
FIG. 7 is a view like FIG. 3, but with the teeth removed so that only the blade is shown.
Figure 11:
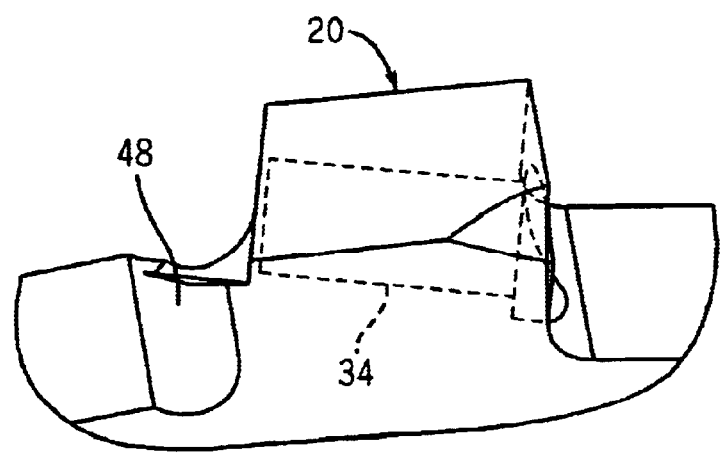
FIG. 11 is a perspective view from the plane of the line 11—11 of FIG. 10.

Referring also to FIGS. 2–6, each tooth 14 is integrally formed in one piece with a head 30 and a shank 32. The shank 32 is cylindrical and sized to fit within a bore 34 (FIG. 7) which is formed in each tooth holder 20. The bores 34 are tangent to radii of the disc 12 and alternately angled upwardly or downwardly at approximately a 10° angle (FIGS. 9 and 11) to the plane of rotation of the disc 12.

The shank 32 of each tooth 14 is bored from its rear face and tapped so as to be secured in the bores 34 with the fasteners 16. As illustrated in FIGS. 8 and 9, each bore 34 is straight through and just slightly larger than the shank 32, and a washer 17 (FIG. 3) is used under the head of each fastener 16 to secure the tooth. Alternatively, the washer 17 can be eliminated if the bore 34 is formed as stepped down in diameter adjacent to the head of the fastener 16. While the tooth 14 having a shank 32 is disclosed in the preferred embodiment, it should be noted that it would also be possible to make teeth of the invention without shanks, so that the fasteners 16 would be threaded directly into the rear mounting surface of the head 30, or through a hole in the tooth for screwing or bolting to the tooth holder.

Each tooth 14 has three cutting corners 40 spaced 1200 apart (FIG. 6), which at their forward ends define cutting tips 47. A pair of flat angled side surfaces 41, which are at approximately 90° to each other, define each corner 40. The intersection of each pair of surfaces 41 which define a corner 40 is truncated by a corner surface 43 which is formed in a turning operation as a section of a cone centered on the axis of the tooth 14. Between any two corners 40, the two sides 41 define a convex shallow V-shape, with the apex 42 of each V-shape half-way between the corners 40. This shape provides for slower wear of the tooth. The surfaces 41 and 43 may taper rearwardly at a shallow angle as illustrated, or may not.

Figure 2:
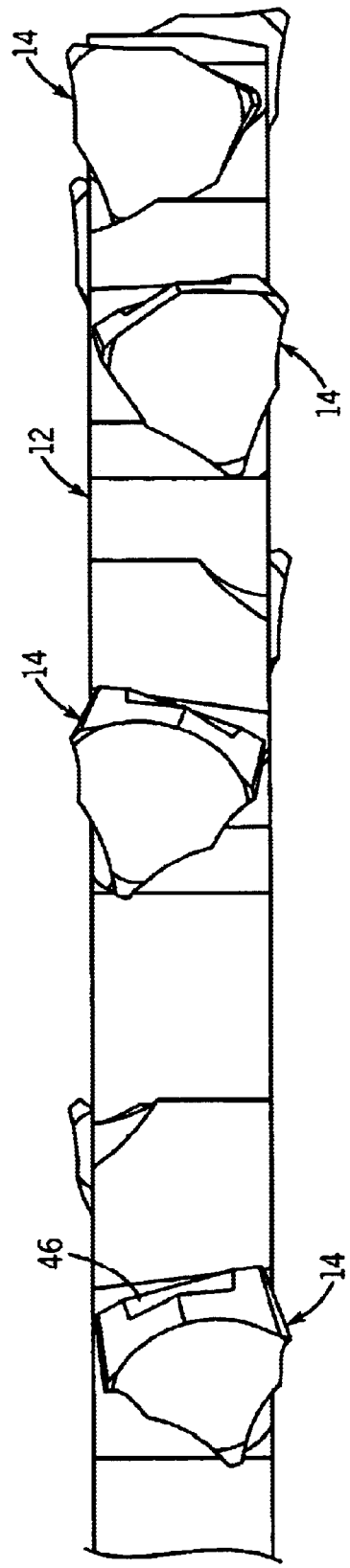
FIG. 2 is a plan view of the blade of FIG. 1 from the plane of the line 2—2 of FIG. 1.
Figure 3:
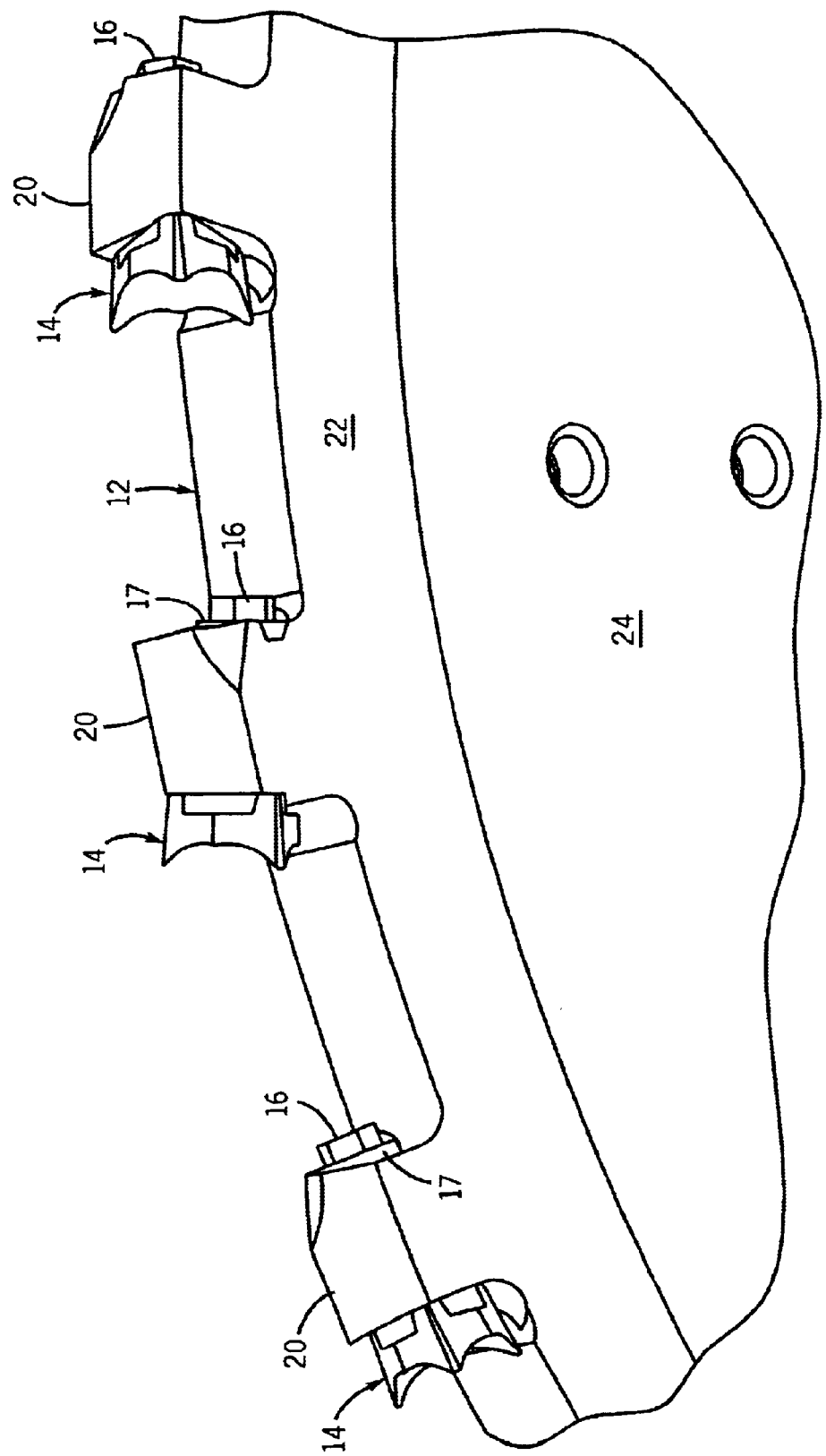
FIG. 3 is a perspective view of a portion of the blade showing three teeth and corresponding tooth holders of the blade.
Figure 4:
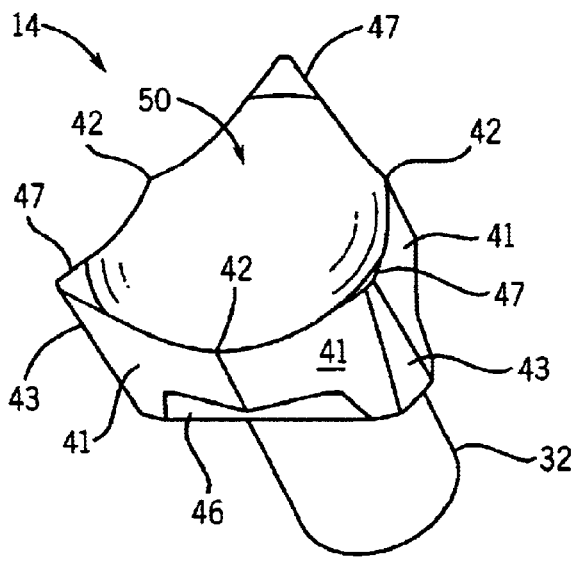
FIG. 4 is a perspective view of one of the teeth.

As shown in FIG. 2, the teeth 14 are mounted to the disc 12 such that only one cutting tip 47 of each tooth 14 is exposed outside of the thickness of the rim 22 or tooth holder 20, in other words, to one axial side or the other of the outer perimeter of the disc 12 such that it is in either the upper cutting plane (the upper side of the kerf) or the lower cutting plane (the lower side of the kerf) of the blade. The other two tips 47 are within the cutting envelope, i.e., the plane of the blade so as not to contribute to the cut, and preferably are within the thickness of the rim 22 and tooth holders 20, i.e., the plane of the outer perimeter of the disc, to be fully protected even when the cutting tips of the teeth are fully worn. The two tips 47 which are not in a cutting position are therefore protected from and not in contact with either the upper side of the kerf or the lower side of the kerf. Only the exposed tip 47 does cutting, and therefore only the exposed tip 47 is subjected to wear during the cutting operation. The tips 47 which are exposed on the upper side of the disc 12 do the cutting of the upper side or surface of the kerf, and the tips 47 which are exposed on the lower side of the disc 12 do the cutting of the lower surface of the kerf. Thus, half of the teeth 14 mounted to the disc 12 cut the upper surface of the kerf, and half of the teeth 14 of the disc 12 cut the lower surface of the kerf. It is noted, however, that the invention is not limited to an arrangement in which the teeth alternate around the periphery between cutting the upper and lower surfaces of the kerf, or having equal numbers of teeth cutting the upper and lower surfaces of the kerf.

Figure 5:
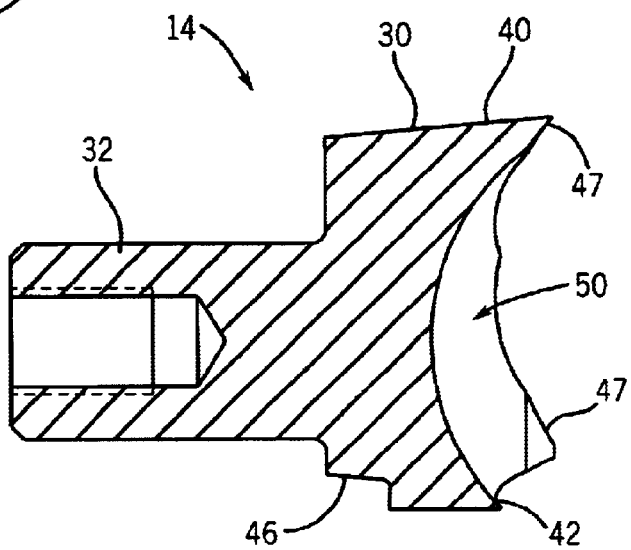
FIG. 5 is a cross-sectional view of the tooth of FIG. 4 from the plane of the line 5—5 of FIG. 6.
Figure 6:
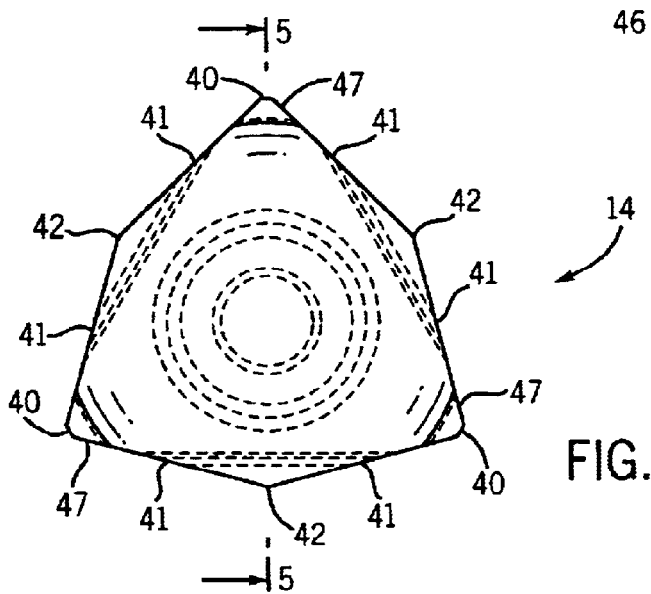
FIG. 6 is a plan view of the attack face of the tooth.
Figure 10:
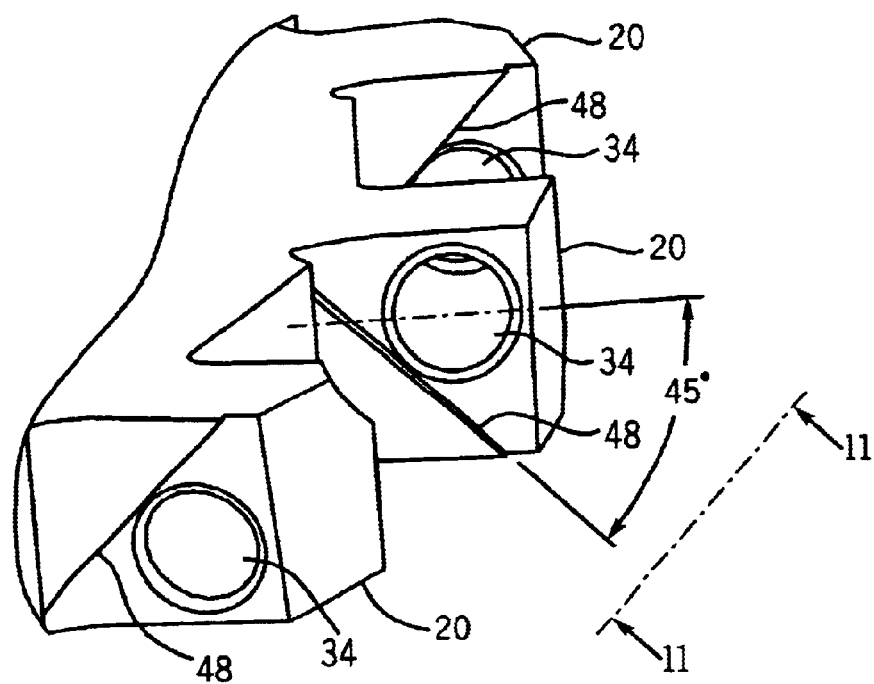
FIG. 10 is a perspective view from the plane of the line 10—10 of FIG. 9.

Each tooth 14 has three flat locating surfaces 46 machined into the side surfaces of the head 30 at the rear end of the head 30, undercutting the apexes 42. The surfaces 48 are at 45° relative to the plane of the disc when viewed along the axis of the tooth, as shown in FIG. 10, and alternate in angular orientation from one tooth holder 20 to the next adjacent tooth holder 20. The flat surfaces 46 of the teeth 14 are at approximately 90° to a line through the center of the tooth that intersects the cutting tip opposite from the surface 46. The flat locating surfaces 46 face the flat surfaces 48 of the tooth holders 20 to prevent rotation of the teeth 14 relative to the tooth holders 20. This arrangement results in the interface between the surfaces 46 and 48 being able to counteract vertical (in the direction of the axis of rotation of the blade), horizontal (the direction in the plane of the blade) and tangential forces, to relieve the fasteners 16 or shanks 32 from having to bear these forces. The surfaces 46 and 48 may be parallel to the axis of the tooth, or could be angled (as illustrated in FIG. 5) relative to the axis of the tooth so as to provide for a preload force when the fasteners 16 are tightened.

As illustrated, the teeth 14 have an attack face 50 which is formed by a spherical surface everywhere except immediately adjacent to the cutting tips 47, where it is defined by a conical surface having a cone angle of about 80°. If the spherical surface were continued all the way to the ends of the tips 47, the tips 47 would become very thin and pointed. Therefore, the tips 47 are truncated with a conical surface. It should be noted that although a spherical surface is preferred for chip flow, the attack face 50 could be defined by a conical surface or a surface of any other shape, for example flat. It should also be noted that the attack face 50 could have carbide plates attached to it by any suitable means, e.g. brazing. For background, see U.S. Pat. Nos. 5,579,674; 5,647,263; or 5,813,308.

A blade of the invention results in being able to use a smaller tooth, which results in a smaller tooth gullet, (the space in front of the attack face of each tooth to the next tooth holder). The smaller gullet permits the use of a larger butt plate, since the butt plate can be extended out to a further radius relative to the cutting tips. In addition, a blade of the invention permits varying the size of the kerf by varying the amount of tooth stagger, i.e., the angle at which the axes of the teeth are mounted or by varying the axial distance (relative to the axis of the blade) between teeth. However, the invention is not limited to using staggered teeth in which their axes are alternately angled up and down, but the invention could be practiced with teeth having axes lying within the plane of rotation, i.e. with the axis of the tooth aligned with the direction of cut. However, alternating the angle of the tooth improves the rake of the tooth and reduces the disc thickness for a given kerf size.

Many modifications and variations to the preferred embodiment described will be apparent to those skilled in the art. Therefore, the invention should not be limited to the embodiment described, but should be defined by the claims which follow.

I claim:

1. A saw blade for a disc saw felling head comprising a saw blade disc having a plurality of tooth holders at an outer perimeter thereof, each said tooth holder mounting tooth having exactly three cutting tips, and wherein only one tip of each said tooth is exposed axially beyond a plane of said outer perimter to cut either an upper or lower surface of a kerf in a tree, wherein each said tooth is rotatable so as to present a different one of its cutting tips as the tip which is exposed, wherein side surfaces of said tooth which define corners of said tooth at which said tips are positioned diverge from one another at an angle greater than 60 degrees to an apex of each said side surface.

2. A saw blade as claimed in claim 1, wherein said tooth has an attack face defined at least in part by a spherical surface.

3. A saw blade as claimed in claim 2, wherein said attack face is defined by a conical surface adjacent to said tips.

4. A saw blade as claimed in claim 1, wherein side surfaces of said tooth between adjacent cutting tips are convex.

5. A saw blade as claimed in claim 1, wherein said tooth has a side surface which is machined so as to mate with a corresponding surface on the blade disc so as to orient an axis of said tooth angularly either up or down with respect to a cutting plane of said blade.

6. A saw blade disc as claimed in claim 1, wherein each said tooth is rotatable so as to present a different one of its cutting tips as the tip which is exposed.

7. A saw blade disc as claimed in claim 1, wherein each said tooth has an axis which is tangent to a radius of the disc and angled relative to a plane of the disc.

\* \* \* \* \*

UNITED STATES PATENT AND TRADEMARK OFFICE
CERTIFICATE OF CORRECTION

PATENT NO. : 6,769,343 B2 Page 1 of 1
DATED : August 3, 2004
INVENTOR(S) : DiSabatino It is certified that error appears in the above-identified patent and that said Letters Patent is hereby corrected as shown below:

Column 3,
Line 24, "1200" should be -- 120º --.

Column 4,
Line 58, "mounting tooth" should be -- mounting a tooth --.
Line 61, "perimeter" should be -- perimeter --.

Signed and Sealed this

Nineteenth Day of October, 2004

JON W. DUDAS
*Director of the United States Patent and Trademark Office*